(No Model.)
E. T. McKAIG.
LOCK.
No. 511,738. Patented Dec. 26, 1893.
Fig. 1.
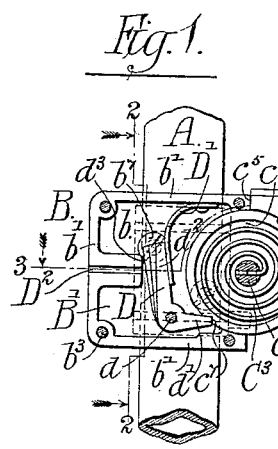
Fig. 2.
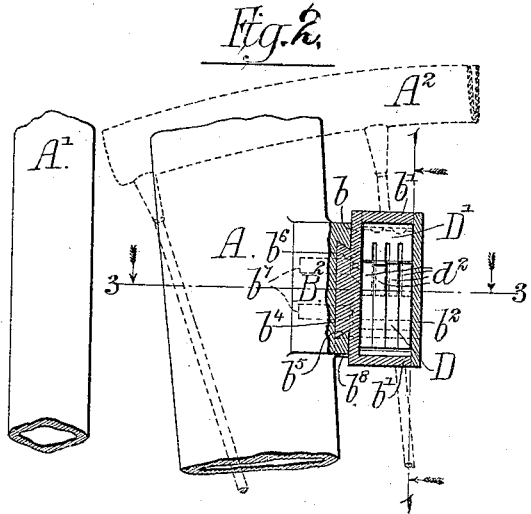
Fig. 3.
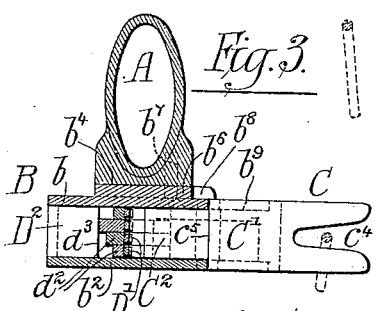
Fig. 5.
Fig. 4.
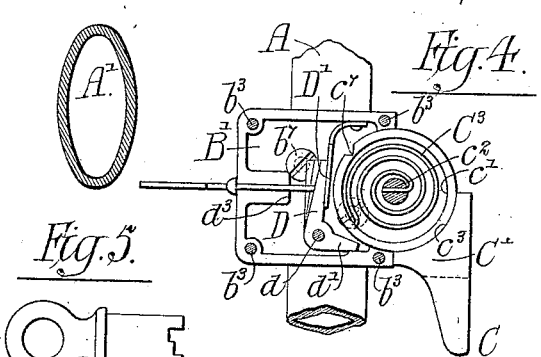
Fig. 6.
Fig. 9.
Fig. 8.
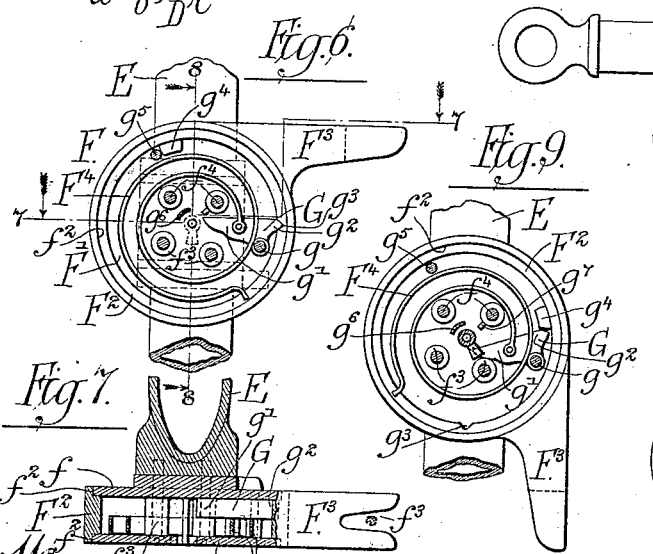
Fig. 7.
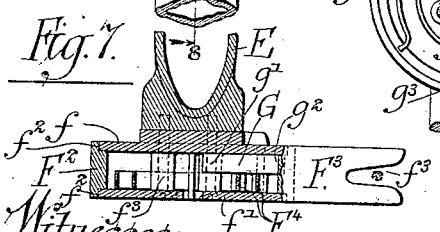
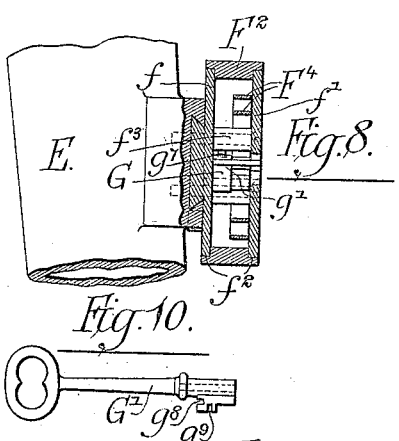
Fig. 10.
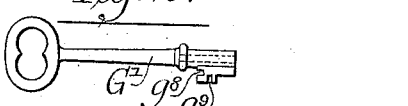
Witnesses:-
Louis W. F. Whitehead.
Geo. E. Waldo.
Inventor:-
Eddy T. McKaig.
by Dayton Pooler Brown
his Attorneys.
THE NATIONAL LITHOGRAPHING COMPANY,
WASHINGTON, D. C.

UNITED STATES PATENT OFFICE.

EDDY T. McKAIG, OF CHICAGO, ILLINOIS.

LOCK.

SPECIFICATION forming part of Letters Patent No. 511,738, dated December 26, 1893.

Application filed July 18, 1892. Serial No. 440,392. (No model.)

*To all whom it may concern:*

Be it known that I, EDDY T. MCKAIG, of Chicago, in the county of Cook and State of Illinois, have invented certain new and useful Improvements in Locks; and I do hereby declare that the following is a full, clear, and exact description thereof, reference being had to the accompanying drawings, and to the letters of reference marked thereon, which form a part of this specification.

This invention relates to improvements in locks for bicycle wheels whereby a wheel or wheels of a bicycle may be securely locked against rotation, when desired, and the bicycle thereby rendered inoperative until said wheel is again released by the opening of the lock. I am aware that locks have heretofore been provided for this purpose, but said locks have been complicated in design and the locking has been effected by thrusting a bolt between the spokes of the wheel. This method of locking the wheel is objectionable in that the wheel is allowed an amount of play equal to the distance between spokes by which the spokes which come into contact with the locking bolt are liable to be bent, sprung, or otherwise injured.

The object of the present invention is to provide a lock which shall combine efficiency of operation with simplicity and economy of construction, and to this end the invention consists in the novel features and combination of features of construction herein illustrated and described and which are more specifically pointed out in the appended claims.

In the accompanying drawings: Figure 1 is a front view of the lock, the locking bar being in position to engage a spoke wheel and the front plate of said lock being removed, as indicated by the line 1—1 of Fig. 2, so as to expose the operative parts of the lock. Fig. 2 is a vertical sectional view of the lock on the line 2—2 of Fig. 1, showing the fork of the bicycle in projection and showing a portion of the rim and spokes of the wheel in dotted lines. Fig. 3 is a horizontal sectional view of the lock and forks on the line 3—3 of Fig. 1, showing the operative parts in projection. Fig. 4 is a view similar to Fig. 1, showing the relation of the parts when unlocked and the key inserted in the lock so as to disengage the locking levers and release the locking bar. Fig. 5 is a view of a key of proper form to operate the lock shown. Fig. 6 is a modification of the lock shown in Figs. 1 to 5, whereby my improvements are embodied in a ward lock. Fig. 7 is a horizontal sectional view of said lock on the line 7—7 of Fig. 6. Fig. 8 is a vertical section on the line 8—8 of Fig. 6. Fig. 9 is a view similar to Fig. 6, showing the parts in unlocked position. Fig. 10 is a key for operating the modified form of lock.

As shown, A A' represent the prongs of the fork, and $A^2$ the wheel of a bicycle, all of which may be of any approved or desired construction.

The lock I designate, as a whole, by B. The operative parts of said lock are mounted within a suitable casing B' consisting of a rear wall $b$, side walls $b'$ preferably made integral with said rear wall, and a removable front wall $b^2$ which, after the lock is assembled, is secured to the body of said casing by means of rivets $b^3$ anchored in the side walls $b'$ of the casing, or in any other suitable manner. Said lock B, which will hereinafter be described in detail, is secured to one of the prongs of the fork just within the rim of the wheel $A^2$; any desired or approved means being employed for securing said lock in position. In the preferable construction shown, a boss $B^2$ is brazed or soldered to the prong A of the bicycle fork so as to extend, longitudinally, parallel to the plane of the wheel. The front or outer surface $b^4$ of this boss is dressed or faced off and a transverse dovetail groove $b^5$ is formed therein, which groove is adapted to receive a correspondingly shaped dovetail lug or boss $b^6$ secured to and preferably formed integral with the rear wall $b$ of the casing B'. Screws $b^7$ inserted through the rear wall $b$ of the casing and threaded into the boss $B^2$, serve to secure the lock rigidly in position, and moreover, said screws being within the chamber of the casing B', secure the front wall $b^2$ of the lock in position and render it impossible to remove said lock from its position on the fork. A lug $b^8$ is formed upon the rear wall $b$ on the outside of said casing and toward the side thereof in which the locking bar is mounted, as hereinafter described, and is adapted to come into contact with the edge of the boss $B^2$. Said lug $b^8$ will therefore obviously necessitate the insertion of the lock into position from the side of the boss $B^2$ adjacent to the wheel $A^2$ and will also prevent its removal from position except on the same side thereof.

Referring now to Figs. 1 to 5 inclusive of the drawings, the operative parts of said lock, which I will now describe in detail, comprise what, for convenient reference, I term a locking-bar C and any desired number of detents D which are adapted to engage a catch on the locking-bar C and secure the same in locked position.

The locking-bar C consists of a locking-bar proper, $C'$, and a cylindrical barrel or drum $C^2$ formed integral therewith, the front end of said barrel or drum being open and the rear end thereof being closed by a wall $c$ which is provided with a central aperture $c'$. Said locking-bar C is pivoted within the casing $B'$ at the side thereof adjacent to the wheel $A^2$ upon a pivot stud $c^2$, the side of said casing $B'$ adjacent to said wheel $A^2$ being open to allow the projection without the casing $B'$ of the locking-bar proper $C'$, and also to allow pivotal motion thereof about the stud $c^2$. The said pivot stud $c^2$ extends across the cavity of the casing $B'$ at right angles to the rear wall $b$ and the front wall $b^2$ in which its ends are mounted, the ends of said stud $c^2$ being squared and fitted to square holes in said casing walls, as shown in dotted lines in Figs. 1 and 3, whereby said stud is held against rotary motion.

Both the rear wall $b$ and the front wall $b^2$ are provided with semicircular extensions $b^9$, said extensions being concentric with the stud or axle $c^2$ and of the same diameter as the drum or barrel $C^2$, and the inner, adjacent surfaces of said rear wall $b$ and front wall $b^2$ being faced or dressed off to form parallel surfaces, and the barrel or drum $C^2$ being fitted between said walls. The said front and rear walls of the casing $B'$, with the extensions $b^9$ thereof, thus form bearing surfaces engaging the ends of the barrel $C^2$ and supporting the locking-bar C against a force tending to move it laterally. Preferably, the width of the locking-bar proper, $C'$, is equal to the thickness of the casing $B'$ of the lock. A circular shoulder $c^3$ is thus formed at the point of junction of said locking-bar proper, $C'$, and the barrel $C^2$, said shoulder engaging or bearing upon the peripheries of the circular extensions $b^9$ of the front and rear walls $b$ and $b^2$ of the casing $B'$ to give additional support to the locking-bar C.

The length of the locking-bar C is such that when said lock B is in position upon the bicycle fork and the locking-bar is in a practically horizontal position, the end of said locking-bar will project through and beyond the spokes of the wheel $A^2$. A notch $c^4$ is formed in the free end of said locking bar, said notch being of such depth as to allow said locking-bar to be moved into a horizontal position about its pivot. From the construction described it is obvious that when said locking-bar is swung into horizontal position the sides of the notch $c^4$ will embrace the spokes of the wheel $A^2$ in proper position therefor and thus lock said wheel against rotary motion. It is also obvious that the locking-bar proper $C'$ coming into contact with the edges of the opening in the lock casing, $B'$, through which said locking-bar proper projects, will limit the pivotal movement of the locking-bar C about its pivot; preferably, however, shoulders $c^5$ $c^6$ are formed on the locking-bar C which are respectively adapted to come into contact with the end of the casing B above and below the opening in the side thereof for said locking-bar, the limits of movement being from a horizontal position, as shown in Fig. 1, of said locking-bar proper $C'$, in which it locks the wheel, to a position practically at right angles thereto, so that it will clear the spokes of the wheel, as shown in Fig. 4. A spiral spring $C^3$, one end of which is secured to the non-rotatable stud or axle $c^2$ and the other to the cylindrical barrel $C^2$, maintains the locking-bar C normally in the depressed position shown in Fig. 4, in which position of said locking-bar the wheel $A^2$ is free to turn.

The detents D, which, in the instance illustrated, are four in number, are made in the form of bell-cranks and are pivoted at their angles to a pivot stud or axle $d$ which is practically parallel with the stud $c^2$ the opposite ends of which are secured in the front and rear walls of the lock casing $B'$. The ends of the horizontal arms $d'$ of said detents are adapted to engage a transverse notch $c^7$ formed in the periphery of the barrel or drum $C^2$, and a leaf spring $D'$ secured to the interior of one side of the casing, bears upon the vertical arms $d^2$ of the detents D on the side thereof adjacent to the barrel $C^2$ and in such manner as to cause the ends of the arms $d'$ to engage the notch $c^7$ when said notch and detents are in position for such engagement. The relation of the various operative parts of the lock is such that the shoulder $c^5$ will come into contact with the side of the lock casing $B'$ above the opening for the locking-bar C at the time that the detents D engage the notch $c^7$ in the periphery of the barrel C, so that said locking-bar is thus held against pivotal movement in either direction. The detents D may be disengaged from the notch $c^7$ in the barrel $C^2$ of the locking-bar by inserting a properly shaped key through a keyhole $D^2$ formed in the side of the lock casing adjacent to and near the upper end of the arms $d^2$ of said detents. The arms $d'$ of the detents D are preferably all of the same shape, and the sides thereof remote from the barrel $C^2$ are adapted to come into contact with a shoulder $d^3$ formed on the interior of the side of the casing in such manner as to limit the pivotal movement of the detents D against the force of the spring $D^2$ to enough movement only to insure the disengagement of the detents from the notch $c^7$, thereby effecting the release of the locking-bar C. The vertical arms $d^2$ of the detents D are of different thicknesses, as clearly shown in Fig. 3 of the drawings, the difference in thickness between the arms of the various detents being greater than the amount of pivotal movement necessary to disengage the arms $d$ from the notch $c^7$. As a consequence of this construction the said detents can only be released by means of a key provided with clefts corresponding in depth with the difference in thickness of the various detents, so that the bottoms of said clefts will strike all of said detents simultaneously, or practically so, whereby all of said detents will be moved the same distance by an inward movement of the key.

A key for unlocking a lock of the construction illustrated is shown in Fig. 5. The limited movement of said detents D and the difference in thickness of their upper ends obviously make it impossible to operate said lock except with a key made especially for the purpose.

The operation of the lock is as follows: The spring $C^3$, as heretofore stated, maintains the locking-bar C normally in a depressed position so as to allow the wheel $A^2$ to turn freely. When it is desired to lock said wheel from turning a spoke of the wheel is brought opposite to the notch $c^4$ in the locking-bar C and said locking-bar is then raised against the force of the spring $C^3$ until the detents D engage the notch $c^7$ in the periphery of the barrel $C^2$ of the locking-bar, which, as heretofore stated, is at the time the shoulder $c^5$ strikes the end of the casing B above the opening for said locking-bar. When in this position the locking-bar proper C' is practically horizontal and the notch $c^4$ is in engagement with a single spoke of the wheel, the contact of the shoulder $c^5$ and the side of the casing preventing pivotal movement in one direction and the engagement of the detents D with the notch $c^7$ preventing pivotal movement of said locking-bar in the opposite direction, and the wheel is thus locked against rotary movement. When it is again desired to use the bicycle the key is inserted through the keyhole D' so as to disengage the detents D from the notch $c^7$ whereupon the spring $C^3$ will throw the locking-bar C into its depressed position and thus release the wheel.

Referring now to Figs. 6 to 10 of the drawings, both inclusive, in which the modified form of the invention is illustrated, E is a prong of a bicycle fork and F the lock secured thereto. The manner of securing said lock F to said prong E is identical with that illustrated in Figs. 1 to 5 of the drawings and heretofore described and no further description thereof is necessary.

The casing of the lock, which I designate by F', is circular and consists of a rear wall $f$, a front detachable wall $f'$, and a cylindrical drum or barrel $F^2$ revolubly mounted between said front and rear walls, said drum or barrel being countersunk at each side, as shown at $f^2$, to receive the said front and rear walls. In order to prevent binding of said barrel between the walls, said walls are maintained at a fixed distance from each other by means of posts or pillars $f^3$ which are preferably made integral with the rear wall $f$ and upon which the front wall $f'$ rests, screws $f^4$ being used to secure said front wall in position, said screws $f^4$ preferably extending through the rear wall of the casing into the boss on the fork of the bicycle. One set of screws thus serves to secure the walls of the casing in position and at the same time to secure the lock to the frame of the bicycle.

Secured to and preferably made integral with the barrel $F^2$ is a locking bar $F^3$ in the free end of which is formed a notch $f^5$ which is adapted to embrace a spoke of the bicycle wheel and lock said wheel against rotation, in the manner hereinbefore described in detail in connection with the form of lock shown in Figs. 1 to 5 of the drawings.

A spiral spring $F^4$ is mounted within the casing of the lock F, one end thereof being secured to the revoluble casing F' and the other end to a detent G, said spring being so applied as to maintain the locking-bar $F^3$ normally in a depressed position in which the wheel is free to rotate. The detent G is made in the form of a bell-crank and is pivoted at its angle upon a stud $g$ secured at its ends in the front and rear walls of the casing. The spring $F^4$ is secured to the arm $g'$ of the detent G and operates to hold the end of the other arm $g^2$ of said detent G normally in position to engage the notch $g^3$ formed in the inner surface of the barrel $F^2$ and to cause the engagement of said detent with said notch when they are in proper position therefor. A lug $g^4$ formed on the inner surface of the barrel $F^2$ is adapted to come into contact with the pin $g^5$ and with the arm $g'$ of the detent G, serves to limit the rotary movement of the barrel $F^2$, the relation of the parts being such that the lug $g^4$ will come into contact with the pin $g^5$ at the same time that the detent G engages the notch $g^3$, which is at the time the locking-bar $F^2$ is in position to lock the wheel from turning. The arm $g'$ of the detent G extends toward the center of the lock casing and is adapted to be depressed so as to disengage the arm $g^2$ of the detent G from the notch $g^3$ by means of a turning or ward key G' which may be of any approved construction. As shown, wards $g^6$ and $g^7$ are provided with the casing of the lock, and corresponding clefts $g^8$ and $g^9$ are formed in the web of the key so that the key may be turned to depress the arm $g'$ of the detent G and disengage said detent from the notch $g^3$ and thus release the barrel $F^2$ and disengage the locking-bar $F^3$ from the spoke of the wheel.

Obviously the lock described may be variously modified from the constructions described without departing from the scope of my invention and I do not therefore limit myself to the constructions shown.

I claim—

1. A bicycle lock comprising a hollow casing, a locking bar mounted upon a pivot located within the casing and adapted to engage the spokes of a bicycle wheel, and means for securing said locking bar normally out of engagement with said wheel, substantially as described.

2. A bicycle lock comprising a hollow casing, a locking bar, comprising a locking bar proper and a cylindrical drum or barrel mounted upon a pivot arranged within the casing, a notch or notches in said drum or barrel, and one or more detents mounted in said casing and adapted to engage said notch or notches, substantially as described.

3. A bicycle lock comprising a hollow casing, a cylindrical drum or barrel, mounted pivotally therein and provided with a notch or notches and with a locking bar projecting beyond the walls of the casing, one or more detents mounted in said casing and adapted to engage said notch or notches, and means for disengaging said detents to release the drum and its locking bar, substantially as described.

4. A lock comprising a hollow casing, a pivoted locking bar proper, and a cylindrical drum or barrel, one or more notches or catches in said drum or barrel, one or more detents in said casing each adapted to engage one of said catches to prevent pivotal movement of the locking bar in one direction, a stop with which said locking bar engages simultaneously with the engagement of said detents and notches, adapted to prevent pivotal movement of said locking bar in the opposite direction, and a key for disengaging said detents from said notches, substantially as described.

5. A lock comprising a hollow casing, a locking-bar mounted upon a pivot located therein and adapted to engage one of the spokes of a bicycle wheel, a spring applied to said locking bar and exerting a pressure to free it from the wheel, a stop adapted to arrest the movement of said locking bar under the influence of said spring when free from engagement with the wheel, a stop adapted to limit the pivotal movement of said locking bar when moved against the force of said spring, one or more detents each adapted to engage a notch or catch in the barrel of the locking bar simultaneously with the engagement of said locking-bar with the stop last above mentioned, said detents to lock said locking bar against movement under the influence of the spring applied to said locking-bar, a spring or springs, applied to said detents to cause the engagement thereof with the notch in the barrel of the locking bar, and a key to disengage said detents from said notch, substantially as described.

6. The combination with the wheel of a bicycle, of a lock adapted to secure said wheel against rotary motion, said lock comprising a hollow casing secured to the frame of the machine and a locking bar pivotally mounted therein, said locking bar being adapted to engage the wheel at a point distant from its axle, substantially as described, means for securing said locking bar in engagement with said wheel and means for maintaining said locking bar normally out of engagement with said wheel, substantially as described.

7. The combination with the wheel of a bicycle, of a lock adapted to secure said wheel against rotary motion, said lock comprising a hollow casing secured to the frame of the bicycle, a locking-bar pivotally mounted therein, said locking-bar consisting of a cylindrical drum or barrel and of a locking-bar proper projecting without said casing, said locking-bar being adapted to be moved pivotally to engage the wheel at a point distant from the axle, a spring applied to said locking-bar so as to impart pivotal motion thereto, a stop to arrest movement of the locking-bar and maintain it normally out of engagement with the wheel, a second stop to arrest the pivotal motion of the locking-bar against the force of said spring and when in engagement with the wheel, one or more spring actuated detents adapted to engage a notch or catch in said barrel simultaneously with the contact of the locking-bar with said second stop, said detents being adapted to prevent movement of said locking-bar under the influence of the spring applied thereto, substantially as described.

8. The combination with the wheel of a bicycle, of a lock adapted to secure said wheel against rotary motion, said lock comprising a hollow casing secured to the frame of the bicycle and a locking-bar pivotally mounted in said casing, said locking-bar being provided with a notch in its outer end adapted to engage a spoke of the wheel when said locking-bar is pivotally moved, means for securing said locking-bar in engagement with said wheel and means for maintaining said locking-bar normally out of engagement with said wheel, substantially as described.

9. The combination with a bicycle wheel, of a lock adapted to secure said wheel against rotary motion, comprising a hollow casing secured to the frame of the bicycle, a pivoted locking-bar consisting of a cylindrical drum or cylinder and of a locking-bar proper projecting without said casing, said locking-bar proper being provided with a notch in its outer end adapted to engage a spoke of the wheel when said locking-bar is pivotally moved, a spring applied to said locking-bar so as to impart pivotal motion thereto, a stop to arrest movement of the locking-bar and maintain it normally out of engagement with the wheel, a second stop to arrest the pivotal motion of the locking-bar against the force of said spring and when in engagement with the wheel, one or more spring actuated detents adapted to engage a notch or catch in said barrel simultaneously with the contact of the locking-bar with said second stop, said detents being adapted to prevent movement of said locking-bar under the influence of the spring applied thereto, substantially as described.

10. The means described of securing a bicycle lock to the frame of a bicycle, comprising a lug or boss on said frame, a dovetail groove in said boss, a corresponding dovetail lug or boss on the lock casing, and screws inserted through the rear wall of said casing into the boss on the frame, substantially as described.

11. The combination with a boss secured to the frame of a bicycle and a lock comprising a casing and a locking-bar adapted to engage the wheel of the bicycle and lock the same against rotary motion, said lock being secured to said frame by means of a dovetail lug or boss on the casing of said lock fitted to a corresponding dovetail groove on the boss secured to the frame, and screws inserted through said casing into the boss on the frame, of a lug on the exterior of the lock casing at the end of the dovetail boss adjacent to the locking-bar, said lug being so located as to strike the boss on the frame when said lock is inserted in operative position, substantially as described.

In testimony that I claim the foregoing as my invention I affix my signature in presence of two witnesses.

EDDY T. McKAIG.

Witnesses:
C. CLARENCE POOLE,
GEO. E. WALDO.